United States Patent Office 2,767,072
Patented Oct. 16, 1956

2,767,072
SOIL REGENERATION
Henri Coanda, Paris, France

No Drawing. Application April 8, 1952, Serial No. 281,277

Claims priority, application France April 13, 1951

7 Claims. (Cl. 71—7)

As a result of investigations begun over 60 years ago by Berthelot, followed a little later by those of Winogradsky, Beijerinck, Hellriegel and others, and continued to this day by a number of scientists, everything appears to take place as if agriculture was essentially conditioned by the propagation and mutual balance of the microorganisms of the soil, and that all manuring and fertilizers are far more necessary for the balance and sequence of microbic activities than for the superior plants themselves, which are subjects of a superior biological order and merely utilize the products and excretions of the inferior inhabitants of the soil.

On the other hand, according to the various theories of evolution of the cells that constitute the micro-organisms of the soil everything appears to occur as if destined towards a specific differentiation; and this starting from the rates of mutations, the discontinuities, the inertia and orientation of the kinetic energies of the cells in question, while taking account of their faculty of adaptation to their medium.

In fact, further research and observations show that, when a living cell is on the point of being destroyed, substances in the solid, liquid, gaseous, or ionic state, appear and everything occurs as if certain of these substances had been allotted the task of facilitating, stimulating, or aiding in, the creation, maintenance or development of the life of new cells, assuming of course the existence of a supply of energy, which energy may manifest itself in various forms: kinetic, thermal, electrical, electro-magnetic, chemical, photomic, cosmic, radiant, etc.

It therefore appears that, while in general the course of evolution is phyletic in its nature, it may at times be quantic.

It is also more than probable that the zymotic products and excretions that are seen to be derived from the lower orders of the occupants of the soil, may be the consequence of a similar process, but internal within them.

Whether the substances thus obtained come directly from cells or through the agency of micro-organisms makes no fundamental difference. These substances apparently constitute "biotic factors" (growth factors, hormones, auxins, vitamins, zymases, etc.).

Thus everything happens as if life is determined by the ordering, balance and proportionate distribution of these factors.

Such evidence and observations enable one to reach a conception of the processes of the stimulation, maintenance and development of life in the soils, which constitute their regeneration.

The present invention has for an object to provide a regenerating substance for the soil, which contains biotic factors in balanced proportions with selected cultures of micro-organisms, combined in a medium that is nourishing and adequately energizing for the propagation of said micro-organisms and especially for the zymogens.

The biotic factors are mostly extracted from the interior of the paunches of ruminants, especially of oxen and sheep, from fecal matter and urine, and from green vegetation (containing the micro-organisms of chlorophyll).

The micro-organisms, which are chosen according to the special purpose, consist mainly of microbe cultures made in the laboratory. They are then combined so as to obtain their mutual collaboration in producing the best crop of the cultivated plants or trees while at the same time regenerating the soil.

On this subject it should be remembered that the aerobic micro-organisms have a characteristic pigmentation and therefore probably the intensity of their activities depends on a phenomenon related to photosynthesis.

The microbe cultures made in the laboratory and utilized in the fabrication of my regenerating substance serve specially in the production of zymogens and are:

A. The fixers of nitrogen molecules:

(a) The Azotobacteria (aerobic)
    (b) The Clostridia (anaerobic)

(a) The Azotobacteria fix the molecular nitrogen and at the same time give out ammonia, notably when the media to be oxidised diminish; they increase the humic substance by a diastasic phenomenon; their power of fixation is of the order of 8 milligrams of nitrogen per gram of glucose consumed, and they give back 25% of the nitrogen fixed in assimilable nitrogen; for their rapid development they demand substances containing carbon assisted by calcium (role of buffer and catalyst), phosphorus (role of buffer and catalyst), potash (role of catalyst), sulfur (rather complex role), iron (catalyst), magnesium (catalyst), molybdenum (assists the fixation of nitrogen), tungsten (assists the fixation of nitrogen); they can reduce nitrates; they live in symbiosis with the Cytophaga; the optimum pH value is 7.6 and the optimum temperature 82° F. for their medium.

(b) The Clostridia fix the molecular nitrogen without giving off ammonia; their power of fixation is of the order of 3 milligrams of nitrogen per gram of glucose consumed; for their development free of molecular oxygen, they need nearby the same minerals as the Azotobacteria, but less sulfur and more calcium; they cannot reduce nitrates; they live very well in association with the cellulolytic Plectridia (anaerobic); the optimum pH value is 8.6 and the optimum temperature 86° F. for their medium.

(B) The oxidisers of ammonia:

(c) The nitrous ferments.

(1) Nitrosomonas for neutral or alkaline soils (pH optimum from 7.6 to 8.7) and (2) Nitrosocysts for more acid soils (pH optimum from 5.7 to 6.5, where insoluble carbonates are present).

Their proliferation takes place without digestion of the organic matter; they derive all their energy from chemical reactions; they synthetise their cellular matter by the release of carbon from $CO_2$; they need plenty of molecular oxygen for their development, in conjunction with calcium, sulfur, oxides of titanium, cadmium, silicon, etc.

(d) The nitric ferments: (e. g. Nitrobacteria) can proliferate alongside of the Azotobacteria in the same medium; they need plenty of oxygen, supported by oxides of manganese, silicon, and insoluble carbonates of calcium; their optimum pH is from 6 to 8.

(C) The cellulose ferments:

(e) The cellulolytics.
    (f) The moulds.
    (g) The Actinomycetes.

The characteristics of these ferments can be described as follows:

They attack the cellulose by way of the enzymes; they destroy the chains of the cellulose by phosphorolysis; the fermentation of the cellulose is the result of a synergic action of all three cultures; they require for their development substances containing carbon, for $CO_2$ is the sole product of their metabolism; they prepare the substances containing carbon as, for example, those necessary for the Azotobacteria.

The moulds and Actinomycetes proliferate especially in the presence of straw, and their action becomes stronger as the pH diminishes (within certain limits); they need plenty of assimilable nitrogen and plenty of phosphorus; they contain a diastase closely similar to the cellulases.

The above summary of the general characteristics of some of the microbe cultures that enter into the preparation of the soil improver has for an object to explain the reasons of the choice of the constituents of the nourishing and energizing media, adapted to the different cultures I shall expose hereinafter. It is important to note that the powers of fixation and restitution of the bacteria vary with their pigmentation, which varies according to the strength and quality of the light as well as to the action of other radiations.

Further I have ascertained that certain critical proportions must be maintained in the soil between the assimilable mineral elements and the assimilable carbon existing in the organic matters of the soil.

For sugar plants, these proportions are approximately:

Assimilable boron/assimilable carbon 0.00085 to 0.00090
Assimilable manganese/ass. carbon 0.000050 to 0.000060
Assimilable cobalt/ass. carbon 0.000005 to 0.000010

For starch, gluten or cellulose plants these proportions are respectively about 0.00060 to 0.00070, about 0.000030 to 0.000040 and about 0.000010 to 0.000015.

It is therefore an object of my invention to maintain the above-mentioned proportions in the soil.

I have also ascertained that a substance to be assimilable by plants must be capable of oxidation (influence of the rH coefficient); it is therefore important to maintain (by preventing its disappearance) a certain quantity of polyuronid gums in the soil.

It is therefore an object of my invention to maintain in the soil said polyuronid gums by maintaining and developing in the soil bacteria and protozoa existing in the paunches of ruminants.

I have further ascertained that a substance must be at a negative potential in order to be assimilated by a plant and it is therefore another object of the invention to provide such a negative potential and facilitate the fixation of co-enzymes.

My invention has for another object to provide a process for regenerating a soil characterized by a quantitative and qualitative amplification of the biotic factors of said soil by introducing a product comprising biotic factors, selected cultures of micro-organisms and mineral elements in a colloidal condition.

My invention has also for an object to provide a soil regenerator comprising, in balanced proportions, biotic factors, selected cultures of zymogen micro-organisms and a medium that is nourishing and energizing for the propagation of said zymogen micro-organisms.

The principal constituents of my soil improver, more particularly for the cultures of fixers of molecular nitrogen and ferments of cellulose, are:

(a) Half digested products from the insides of the paunches of ruminants, such as oxen and sheep;
(b) Chopped straw;
(c) Chopped green vegetation;
(d) Kitchen refuse of all sorts;
(e) Mineral elements such as phosphorus, potash, silicon, calcium, sulfur, magnesium, iron, cobalt, boron, zinc, molybdenum, titanium and in addition, for the nitrificators, insoluble carbonates of calcium and manganese.

The half digested products may be dispensed with and replaced by addition of saliva constituents to the chopped green vegetation.

When said cultures are well in full development, they are first mixed with each other and afterwards with the biotic factors.

Earthworms or eggs of earthworms may be added to my soil regenerator in order to ensure an adequate aeration of the soil.

The aforesaid and other objects, features and advantages of the invention will be more easily and fully understood from the illustration of the preparation of a soil regenerator according to the invention, being understood that the invention is not restricted to the details of the illustrated and described preparation but that is susceptible to modifications and adaptations.

Said preparation comprises three stages which will be exposed firstly schematically and then with the full details of the preparation of an exemplary soil regenerator.

*First stage.*—Insides of paunches with their liquid (chiefly containing ptyalines) are collected from the slaughterhouses. They undergo then severe, but relatively slow, pressing, so as to separate the liquid from the solid portions, which may form a cake or small particles. The whole may then be inserted into cold rooms (at approximately 35 to 43 degrees F.).

The same process is employed for the green vegetation (grasses, nettles, green leaves, fresh plants, etc.): they are pressed and separated as far as possible from their liquid. To facilitate this operation the green vegetation is chopped, kneaded or crushed.

The whole is kept for several days in cold, damp and dark chambers.

Then the solid particles or cakes from the insides of paunches and the green vegetation are withdrawn from the cold chambers, introduced in crushing machines and mixed with chopped straw in the proportions of 1 part of pebbles or cakes, 1 part of green vegetation and 1 part of straw. Then dry earth, sterilized with 2% carbon sulfide, is added thereto and thoroughly mixed therewith; the earth is added in the proportion of 1 part of earth to 2 parts of each of the three above-mentioned constituents. To the obtained mixture one adds 20% of phosphates (preferably bi-calcic or tri-calcic phosphates and of organic origin, or tri-ammonium phosphates) and 5% of potash (chlorides or nitrates of potassium, according to the circumstances). The whole is thoroughly stirred and 4% of starch (barley flour, for instance) is added thereto.

The mixture is then sprayed with the third of its weight of the liquid formed from the insides of the paunches, to which has been added the liquid resulting from the green vegetation in the proportion of 3 parts of liquid from the paunches and 1 part of liquid from the green vegetation. To this mixture is added 15% of liquid manure, 2% of fresh fecal matter of ruminants and 1% of quite fresh activated fecal matter of horses.

After several hours the aerated mixture begins to heat, and can then be used to heat and maintain between 85 and 105° F. the chambers where the liquids are concentrated under vacuum, as above-mentioned.

Into the cooled products are injected the suitable bacteria cultures, to which have been added colloidal oligoelements of iron, zinc, cobalt, titanium, tungsten, molybdenum, boron, sulfur, silicon. The suspension of the colloids in water is reinforced and stabilized by the introduction therein of glucose, gums or glycerine. The product is thoroughly stirred, dried and, according to requirements, displayed in strongly lighted and/or well ventilated chambers. The product is then ready for mixture with the micro-organisms and the colloids.

Meanwhile the stocks of micro-organisms are prepared in the laboratory, being cultivated on a medium of silica-gel and sterilized soil. After a few days in the incubator they are transferred on a soil to which energizing products have been added. The colloidal bodies are prepared separately.

The bacteria stocks and cultures are transferred to a liquid medium and mixed with the colloids in proportions suitable to each use (the surface of the liquid medium should be as large as possible, as aerobic bacteria are particularly concerned). Once their development has started (when the films begin to be visible), the bacteria are mixed with the nourishing and energizing media, which have been prepared as explained previously, and which already contain the biotic factors obtained by the various above-mentioned operations.

In this first stage is fabricated the product used in the second stage.

*Second stage.*—This stage is very similar to the first stage but more straw is introduced and the sterilized soil is replaced by the product obtained in the first stage.

*Third stage.*—In this stage the proportions of the ingredients are changed by taking account of those introduced during the two first stages.

The three stages will be more fully described in the following exemplary and nonlimiting preparation of a soil regenerator according to the invention.

*First stage.*—For this stage are used:
(a) 150 lbs. of insides of paunches, which give 66 lbs. of dry products and 84 lbs. of liquid,
(b) 190 lbs. of fresh grass or green vegetations, which give 68 lbs. of dry products and 122 lbs. of liquid,
(c) 66 lbs. of straw,
(d) 100 lbs. of dry soil,
(e) 60 lbs. of very finely ground phosphates,
(f) 15 lbs. of very finely ground potash (as nitrate, silicate or chloride),
(g) 15 lbs. of starch (e. g. as barley flour).

I have therefore in the product of the first stage:

| (a) Dry matters: | Lbs. | Lbs. |
|---|---|---|
| Paunches | 66 | |
| Green vegetation | 68 | |
| Straw | 66 | |
| Dry soil | 100 | |
| | 300 | |
| +20% phosphates | 60 | |
| +5% potassium | 15 | |
| Total | 375 | |
| +4% starch or barley flour | 15 | |
| Total dry products | 390 | 390 |
| (b) Liquid or sensibly liquid: | | |
| Paunches | 79.95 | |
| Green vegetation | 26.65 | |
| Liquid manure | 19.5 | |
| Fecal matter from oxen | 2.6 | |
| Fecal matter from horses | 1.3 | |
| Total | 130.00 | 130 |
| (c) Bacteria cultures and colloids | | 2 |
| Total | | 522 |
| Partial loss by evaporation due to elevation of temperature and drying | | 22 |
| Product obtained | | 500 |

These 500 lbs. are divided into 5 fractions of 100 lbs. used in the 2nd stage.

*Second stage.*—Take:

| | | |
|---|---|---|
| Paunches dry matter | 66 lbs.+ 84 lbs. | of new liquid |
| Green vegetations dry | 20 lbs.+ 35.8 lbs. | of new liquid |
| Straw | 114 lbs. | 119.8 lbs. total, of which are deducted 106.6 lbs. which are mixed with the liquid manure, etc., to make up to 130 lbs. |
| 1st stage products | 100 lbs. | |
| Total | 300 lbs. | |

The other operations of the second stage are similar to the corresponding ones of the first stage.

The two first stages, during which are fabricated 2500 lbs. of products (five times more than during the first stage), will have required altogether:

| | |
|---|---|
| Dry matter from paunches | 396 lbs. |
| Dry matter from green vegetation | 168 lbs. |
| Chopped straw | 636 lbs. |
| Dry soil | 100 lbs. |
| Phosphates | 360 lbs. |
| Potassium | 90 lbs. |
| Flour (starch) | 90 lbs. |
| Liquid (and products in suspension) | 780 lbs. of 945.4 available. |
| Bacteria cultures and colloids | 12 lbs. |
| Total | 2632 lbs. |
| Losses by evaporation due to elevation of temperature and partial drying (6 times 22 lbs.) | 132 lbs. |
| Remains | 2500 lbs. |

At the end of this second stage, the constituents are therefore introduced in the following approximate proportion in the product:

| | Percent |
|---|---|
| Humidity (with a few products) | 26.00 |
| Straw | 25.44 |
| Dry products of paunches | 15.84 |
| Phosphates | 14.40 |
| Dry green vegetation | 6.72 |
| Dry soil | 4.00 |
| Starch (barley flour) | 3.60 |
| Potassium | 3.60 |
| Various constituents (specially from the liquids) | 0.40 |
| | 100.00 |

| The liquid products comprise: | Pounds |
|---|---|
| From the paunches (6×84 lbs.) | 504 |
| From the green vegetation (122+5×36 lbs.) | 302 |
| From liquid manure (6×19.5 lbs.) | 117 |
| From baceteria cultures and colloids (6×2 lbs.) | 12 |
| | 935 |

The above-mentioned operations (if the elements in suspension represent about 23 lbs.) have absorbed about

| | Pounds |
|---|---|
| 780 lbs.+12 lbs.−23 lbs. | 769 |
| Remains unused (estimation) | 166 |

According to my estimation the operations have absorbed:

(1) Liquid from paunches, about 480 lbs. out of 504 lbs. (leaving 24 lbs.)
(2) Liquid from green vegetation, 160 lbs. out of 302 lbs. (leaving 142 lbs.)

This makes 24+142=166 lbs. left, which contain about 14.6% paunch liquid and 85.4% green vegetation liquid.

The above-mentioned values are, of course, only approximate, because the liquid contents are always very variable: they depend on the food given to the ruminants, before they are killed, and on the state of dryness or the age of the green vegetation. But the figures given are still correct and the surpluses represent a margin of guarantee.

It is also possible greatly to reduce the need for these surpluses by keeping under vacuum the liquids from the green vegetation.

During the preparation of the 2620 lbs., that is prior to the introduction of the bacteria cultures and colloids, the temperature of the whole rises very rapidly to 155–180° F. This should be reduced to about 80–90° F. It is therefore possible to recuperate about 2620 lbs.×84° F. (mean temperature drop)=220,000 B. t. u.

*Third stage.*—The 2500 lbs. from the second stage will allow the fabrication of, say, 16 times 532 lbs.=8500 lbs. of finished products, including 2494 lbs. from the second stage and 6018 lbs. of new added elements.

These 16 portions of 532 lbs. will require for their fabrication:

| | Pounds |
|---|---|
| Products from the 2nd stage | 156 |
| Dry products from paunches | 52 |
| Chopped straw | 100 |
| Dehydrated green vegetation | 14 |
| Calcium carbonate | 62 |
| Dry soil | 20 |
| | 404 |
| Phosphates | 38 |
| Potassium | 10 |
| | 452 |
| Starch (barley flour) | 10 |
| | 462 |
| Liquids (with products in suspension) | 90 |
| | 552 |
| Bacteria cultures and colloids | 2 |
| | 554 |
| Loss by evaporation and drying | 22 |
| | 532 |

The approximate percentages of the constituents of the final product are:

| Constituent | Percent |
|---|---|
| Humidity | 20.30 |
| Straw | 25.95 |
| Dry products of paunches | 14.45 |
| Calcium carbonate | 11.76 |
| Phosphates | 11.45 |
| Dry soil | 5.07 |
| Dehydrated green vegetation | 4.68 |
| Potassium (salts) | 2.94 |
| Starch | 2.93 |
| Bacteria cultures and colloids | 0.49 |
|  | 100.00 |

If the dry soil is considered as a mineral product without organic matter, the main constituent elements of the finished product are:

| | Percent |
|---|---|
| Humidity | 20.30 |
| Minerals | 31.22 |
| Organic matter | 48.48 |

The obtained 8500 lbs. (16 fractions of 532 lbs.) comprise 1222 lbs. of dehydrated products of paunches and 392 lbs. of dehydrated green vegetation.

These 1222 lbs. of dehydrated paunches were obtained from about 2777 lbs. of insides of paunches which have yielded about 15555 lbs. of liquid; the 392 lbs. of dehydrated green vegetation were obtained from about 1095 lbs. of green vegetation, in the fresh condition (straight from the fields or ensilage stores).

Therefore I used:
2777 lbs. of paunches in the gross condition
1095 lbs. of fresh green vegetation
2256 lbs. of straw
1000 lbs. of calcium carbonate
968 lbs. of phosphates
420 lbs. of dry soil
250 lbs. of starch
250 lbs. of potassium
354 lbs. of liquid manure
47 lbs. of fecal matter from oxen
24 lbs. of fecal matter from horses
44 lbs. of bacteria cultures and colloids in order to produce 8500 lbs. of my soil exemplary regenerator.

My regenerator once introduced into the soil, the zymases, enzymes, diastases of all kinds, hormones, auxins, vitamins and growth factors (derived from the cells or through the micro-organisms) will spread in the soil if the temperature, the degree of humidity, the energy factors, the relation between the acidity and alkalinity, the aeration, etc., continue to be suitable and to correspond with the requirements of said zymases, enzymes, etc. It will be necessary to inspect from time to time the soil and, if required, to stimulate such elements which may be out of equilibrium with the whole of the soil.

The invention is not restricted to the specific illustrated embodiment, but is subject to modifications and adaptations which will occur to those skilled in the art, and it should be understood that protection is sought for the invention as covered by the spirit and the language of the attached claims.

What I claim is:

1. A process for the production of a soil regeneration substance consisting in pressing the contents of ruminant paunches to separate the liquid portion containing active biotic factors from the solid portion, pressing green vegetation to extract a liquid portion containing active biotic factors from the solid portion thereof, mixing said solid portions from said paunches and said green vegetation with phosphates to form a solid mixture, mixing the liquid portion from said paunches with the liquid portion from said green vegetation and with liquid manure to form a liquid composition adding to the solid mixture said liquid composition, thereby causing the mixture to become warm, cooling the mixture, inoculating said mixture with microbic cultures selected from the group consisting of fixers of nitrogen molecules, nitrous ferments, nitric ferments, and cellulose ferments, and then adding elements in the colloidal state.

2. A process as defined in claim 1, wherein said green vegetation is subjected to mechanical disintegration before pressing.

3. A process as defined in claim 1, wherein said solid portions of said paunches and of said green vegetation are mixed with potassium salts, dry earth and starch before the addition of said liquid portions.

4. A process as defined in claim 1, wherein said elements in the colloidal state are selected from the group consisting of boron, cadmium, calcium, cobalt, iron, magnesium, manganese, molybdenum, phosphorous, potassium, silicon, sulfur, titanium, tungsten and zinc.

5. A process for the production of a soil regeneration substance consisting in pressing the contents of ruminant paunches to separate the liquid portion containing active biotic factors from the solid portion, submitting green vegetation to mechanical disintegration, pressing said disintegrated green vegetation to extract a liquid portion containing active biotic factors from the solid portion thereof, mixing said solid portions from said paunches and said green vegetation with phosphates, potassium salts, dry earth and starch to form a solid mixture, mixing the liquid portion from said punches with the liquid portion from said green vegetation and with liquid manure to form a liquid composition adding to the solid mixture said liquid composition, thereby causing the mixture to become warm, cooling the mixture, inoculating the mixture with microbic cultures selected from the group consisting of fixers of nitrogen molecules, nitrous ferments, nitric ferments, and cellulose ferments, and then adding elements in the colloidal state selected from the group consisting of boron, cadmium, calcium, cobalt, iron, magnesium, manganese, molybdenum, phosphorous, potassium, silicon, sulfur, titanium, tungsten and zinc.

6. A process as defined in claim 5, wherein said liquid portion and said solid portion of said green vegetation are kept in the dark and in the cold for several days before use.

7. A process for the production of a soil regeneration substance from the contents of ruminant paunches, green vegetation, liquid manure, phosphates, dry earth and microbic cultures, which consists in pressing the contents of the ruminant paunches to produce a liquid portion containing active biotic factors and a solid portion, pressing the green vegetation to produce a liquid portion containing active biotic factors and a solid portion, mixing the solid portion of the paunches, the solid portion of the green vegetation, the phosphates, and the dry earth to form a solid mixture, mixing the liquid portion of the paunches, the liquid portion of the green vegetation and the liquid manure to form a liquid mixture, mixing the solid mixture with the liquid mixture to provide a combined mixture, allowing the combined mixture to cool to room temperature, and adding the microbic cultures to the cooled combined mixture.

References Cited in the file of this patent

UNITED STATES PATENTS

| | | |
|---|---|---|
| 371,630 | Rose | Oct. 18, 1887 |
| 517,486 | Schenck | Apr. 3, 1894 |
| 1,320,701 | Manns | Nov. 4, 1919 |
| 1,524,233 | Berrigan | Jan. 27, 1925 |
| 1,938,647 | Earp-Thomas | Dec. 12, 1933 |
| 2,004,706 | Nuske | June 11, 1935 |
| 2,043,265 | Roeder | June 9, 1936 |
| 2,310,652 | Peter | Feb. 9, 1943 |

FOREIGN PATENTS

| | | |
|---|---|---|
| 13,664 | Great Britain | 1904 |
| 258,149 | Great Britain | Sept. 16, 1926 |
| 488,858 | Great Britain | July 11, 1938 |